US012117391B1

(12) United States Patent
Wang et al.

(10) Patent No.: US 12,117,391 B1
(45) Date of Patent: Oct. 15, 2024

(54) METHOD AND SYSTEM FOR REMOTE IMAGING EXPLOSIVE GASES

(71) Applicant: Hong Kong Applied Science and Technology Research Institute Company Limited, Hong Kong (HK)

(72) Inventors: Naixiang Wang, Hong Kong (HK); Mengting Wu, Hong Kong (HK); Yuelin Wang, Hong Kong (HK); Zhinan Yu, Hong Kong (HK); Ming Leung Vincent Tse, Hong Kong (HK)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 99 days.

(21) Appl. No.: 18/186,962

(22) Filed: Mar. 21, 2023

(51) Int. Cl.
*G01N 21/3504* (2014.01)
*H04N 23/20* (2023.01)
*H04N 23/56* (2023.01)

(52) U.S. Cl.
CPC ......... *G01N 21/3504* (2013.01); *H04N 23/20* (2023.01); *H04N 23/56* (2023.01)

(58) Field of Classification Search
CPC ..... G01N 21/3504; H04N 23/20; H04N 23/56
USPC ...................................................... 348/164
See application file for complete search history.

(56) References Cited

U.S. PATENT DOCUMENTS

| 9,258,495 | B2 | 2/2016 | Zeng et al. |
| 10,422,741 | B2 | 9/2019 | Sandsten et al. |
| 10,473,550 | B2 | 11/2019 | Li et al. |
| 11,143,572 | B2 | 10/2021 | Waxman et al. |
| 2008/0029702 | A1 | 2/2008 | Xu |
| 2013/0342680 | A1 | 12/2013 | Zeng et al. |
| 2015/0369730 | A1 | 12/2015 | Schmidt et al. |

(Continued)

FOREIGN PATENT DOCUMENTS

| CN | 1844893 A | 10/2006 |
| CN | 101641586 A | 2/2010 |

(Continued)

OTHER PUBLICATIONS

International Search Report and Written Opinion of corresponding PCT application No. PCT/CN2023/083062 mailed on Dec. 21, 2023.

(Continued)

*Primary Examiner* — Kathleen M Walsh
(74) *Attorney, Agent, or Firm* — Idea Intellectual Limited; Margaret A. Burke; Sam T. Yip

(57) ABSTRACT

The present invention provides a method and a system for remote imaging of explosive gases in an area. The method comprises: illuminating the area with a light source having a uniform light intensity distribution over an infrared wavelength range; acquiring images of the illuminated area with an image sensor through gas detection filters having bandpass central wavelength corresponding to absorption curves of target gases respectively; determining existence of the target gases based on the acquired images; predicting distribution of gas concertation for existing target gases respectively by using a non-linear prediction model; and constructing gas distribution images of the area based on the predicted distribution of gas concertation. The present invention can recognize different gases with overlapping absorption curves and provide more accurate prediction of gas concentrations.

16 Claims, 9 Drawing Sheets

(56) References Cited

U.S. PATENT DOCUMENTS

2019/0195725 A1  6/2019 Waxman et al.
2022/0026355 A1* 1/2022 Normand ............. G01N 21/314

FOREIGN PATENT DOCUMENTS

| CN | 104596970 B  | 3/2017 |
| CN | 110392824 A  | 10/2019 |
| CN | 111208082 A  | 5/2020 |
| CN | 111413290 A  | 7/2020 |
| CN | 111801569 A  | 10/2020 |
| CN | 113125373 A  | 7/2021 |
| JP | 2003294573 A | 10/2003 |

OTHER PUBLICATIONS

Marc-André Gagnon et al., "Time-resolved Thermal Infrared Multispectral Imaging of Gases and Minerals", Electro-Optical and Infrared Systems: Technology and Applications XI, SPIE, 2014.

* cited by examiner

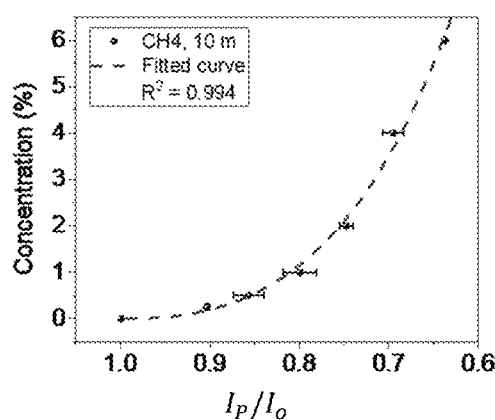 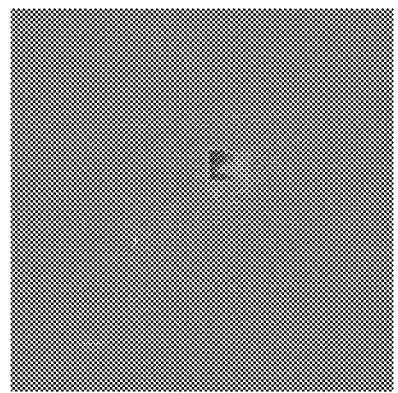
FIG. 6A                    FIG. 6B
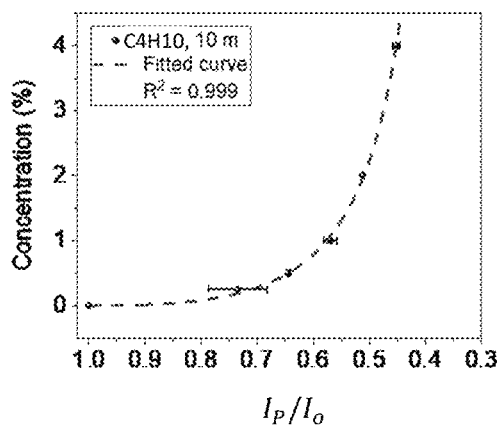 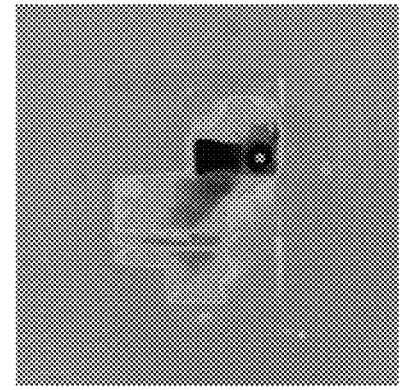
FIG. 7A                    FIG. 7B
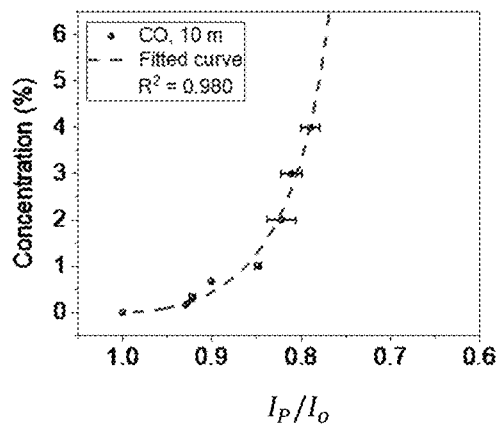 
FIG. 8A                    FIG. 8B

METHOD AND SYSTEM FOR REMOTE IMAGING EXPLOSIVE GASES

FIELD OF THE INVENTION

The present invention generally relates to detection and imaging of gases. More specifically the present invention relates to detection and imaging of multiple explosive and hazardous gases with overlapping infrared absorption bands.

BACKGROUND OF THE INVENTION

Detecting explosive and hazardous gases (such as methane in town gas and natural gas, butane and propane in petroleum gas) leakage and identifying location of leakage are critical to our environmental safety. Several detection methods and systems have been proposed to handle multiple gas detection with high sensitivity. Some gas detectors use infrared cameras to take thermal or infrared images of gas pipeline or specific areas for monitoring and/or detecting gas leakage. However, due to overlapping between infrared absorption curves of methane, butane and propane, it is challenging to distinguish between these gases during detection.

SUMMARY OF THE INVENTION

It is an objective of the present invention to provide a method and a system for remotely detecting and identifying multiple explosive and hazardous gases so as to provide accurate gas leakage concentration information and warning with respect to respective explosive limit for each gas.

In accordance with a first aspect of the present invention, a method for remote imaging of explosive gases in an area is provide. The method comprises: illuminating the area with a light source having a uniform light intensity distribution over an infrared wavelength range; acquiring one or more images of the illuminated area with an image sensor through one or more gas detection filters having bandpass central wavelength corresponding to absorption curves of one or more target gases respectively; determining existence of the one or more target gases based on the one or more acquired images; predicting one or more distribution of gas concertation for one or more existing target gases respectively by using a non-linear prediction model; and constructing one or more gas distribution images of the area based on the one or more predicted distribution of gas concertation.

In accordance with a second aspect of the present invention, a system for remote imaging of explosive gases in an area is provided. The system comprises: an active light source configured to illuminate the area with a light beam having uniform light intensity distribution over the midwave infrared range; an infrared image sensor configured to capture the infrared image of the illuminated area; a filter wheel system including a plurality of detection filters, each having a central wavelength and a full width at half maximum corresponding to an absorption curve of a target gas to be detected; and a processor configured to control the active light source, the image sensor and the filter wheel system to perform the above-said method.

By introducing a background calibration, the precent invention can perform gas imaging of areas of potential gas leakage with a higher sensitivity. With the wavelength-band-based multispectral filter design, the precent invention can recognize of different gases even with overlapping absorption bands, especially methane from butane and propane in a wide concentration range. Moreover, based on the nonlinear gas concentration prediction model, the present invention can clarify the contribution of nonlinearity from different factors (such as gas absorption coefficient, spectrum shape, non-absorbing wavelength) to the calculation of gas concentration such that more accurate gas concentration can be obtained.

BRIEF DESCRIPTION OF THE DRAWINGS

Embodiments of the invention are described in more details hereinafter with reference to the drawings, in which:

FIG. 6A shows an exemplary curve of predicted concentration of methane plotted against detected pixel-intensity; and FIG. 6B shows an exemplary methane distribution image of an area based on the predicted concentration of methane.

FIG. 7A shows an exemplary curve of predicted concentration of butane plotted against detected pixel-intensity; and FIG. 7B shows an exemplary butane distribution image of an area based on the predicted concentration of butane;

FIG. 8A shows an exemplary curve of predicted concentration of carbon monoxide plotted against detected pixel-intensity; and FIG. 8B shows an exemplary carbon monoxide distribution image of an area based on the predicted concentration of carbon monoxide;

DETAILED DESCRIPTION

In the following description, embodiments of the present invention are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1:
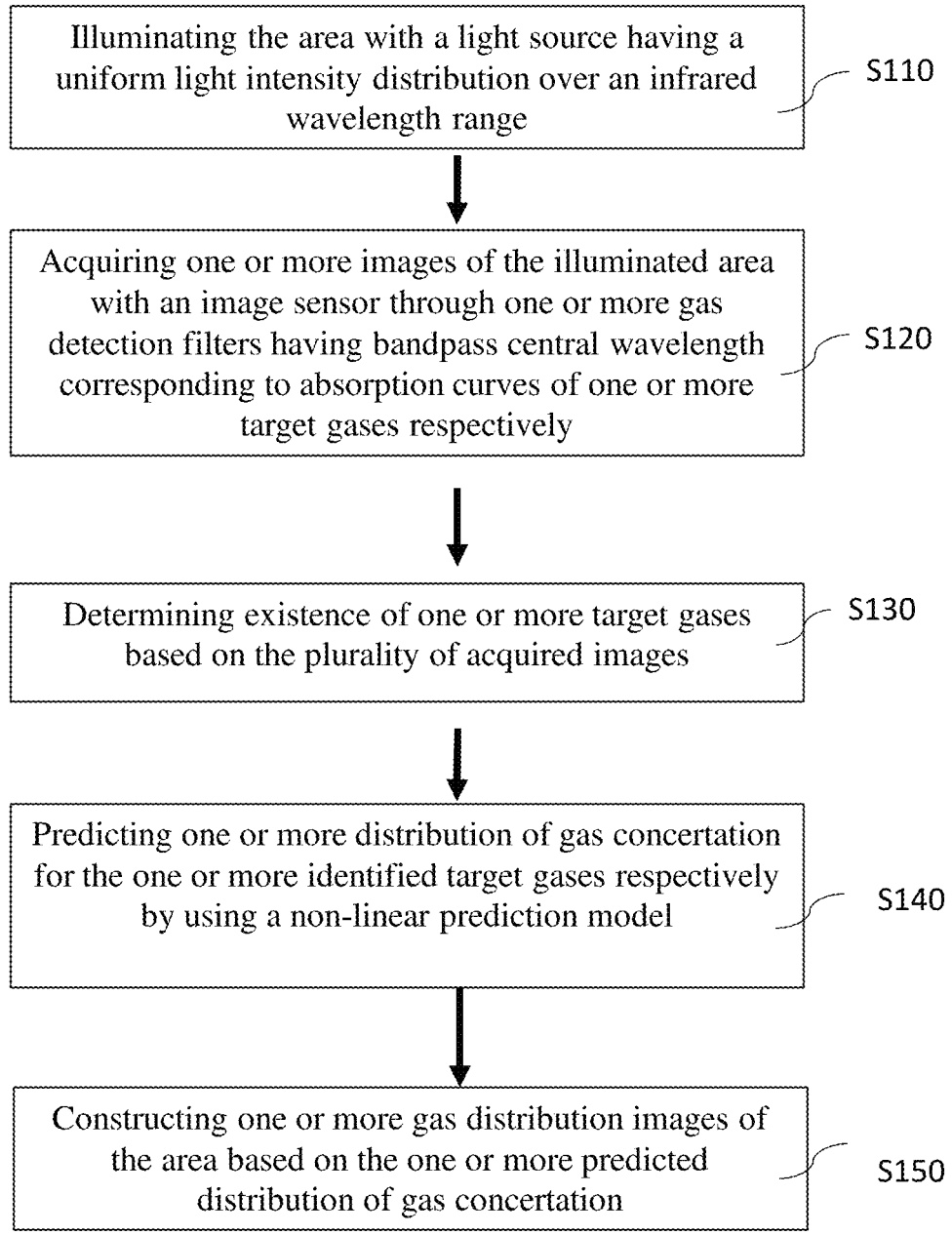
FIG. 1 depicts a method for remote imaging of explosive gases in an area in accordance with some embodiments of the present invention.

FIG. 1 depicts a method for remote imaging of explosive gases in an area in accordance with some embodiments of the present invention. Referring to FIG. 1, the method includes S110: illuminating the area with a light source having a uniform light intensity distribution over an infrared wavelength range;

S120: acquiring one or more images of the illuminated area with an image sensor through one or more gas detection filters having bandpass central wavelength corresponding to absorption bands of one or more target gases respectively;

S130: determining existence of the one or more target gases based on the one or more acquired images;

S140: predicting one or more distribution of gas concertation for one or more existing target gases respectively by using a non-linear prediction model; and S150: constructing one or more gas distribution images of the area based on the one or more predicted distribution of gas concertation.

In step S110, the infrared wavelength range of the light source may be selected to cover absorption bands of the target gases to be detected and imaged. For example, for detecting methane gas ($CH_4$), butane gas ($C_4H_{10}$), propane ($C_3H_8$), carbon monoxide (CO) gas and carbon dioxide ($CO_2$) gas, the light source may have a uniform light intensity distribution over an infrared wavelength range from 3 um to 5 um.

In step S120, the plurality of gas detection filters may be band pass filters implemented in a filter wheel system for filter switching and position setting. Each gas detection filter has a central wavelength and a full width at half maximum (FWHM) corresponding to an absorption curve of a target gas to be detected.

Figure 2:
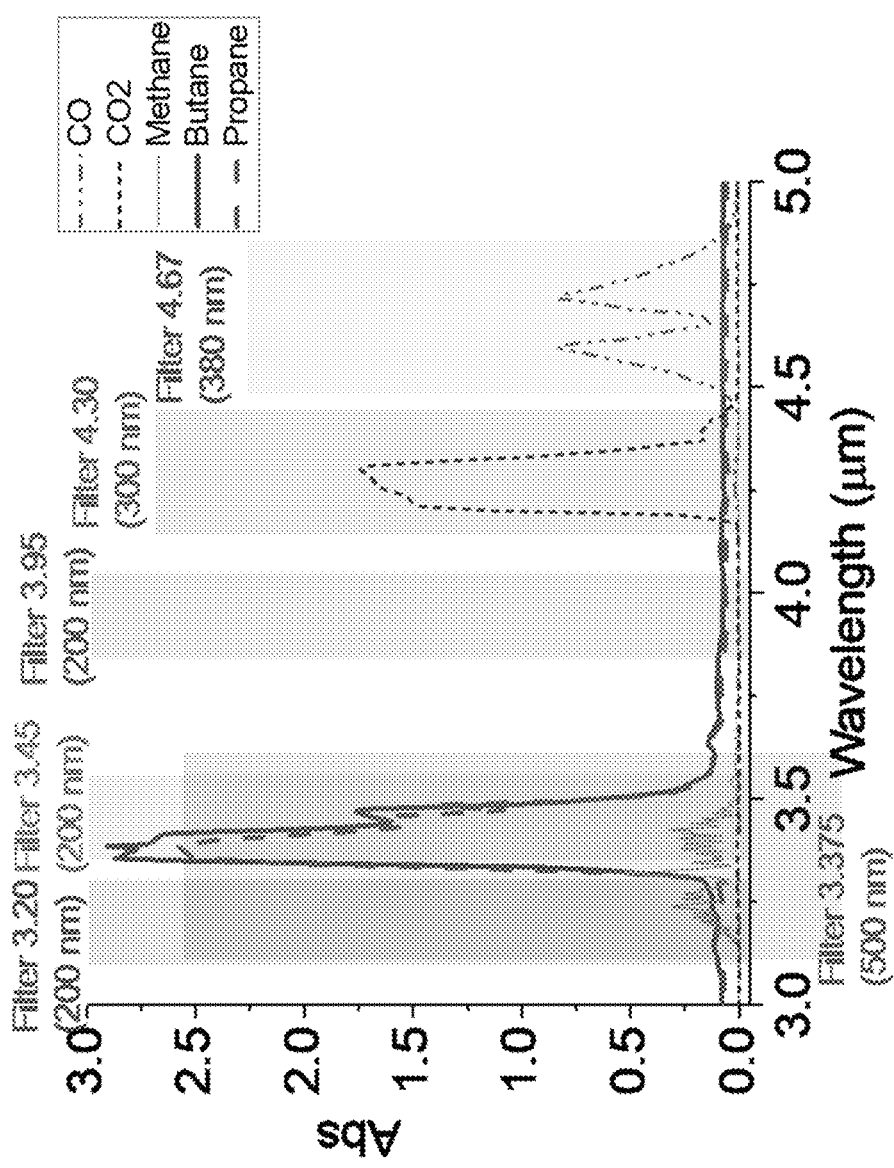
FIG. 2 shows absorption curves of methane ($CH_4$), butane ($C_4H_{10}$), propane ($C_3H_8$), carbon monoxide (CO) and carbon dioxide ($CO_2$), bandpass windows of the corresponding detection filters and the reference filter.

For example, referring to FIG. 2, the plurality of gas detection filters may include: a filter having a central wavelength of 3.20 μm and a FWHM of 200 nm for detecting $CH_4$; a filter having a central wavelength of 3.375 μm and a FWHM of 500 nm for detecting $CH_4$, $C_3H_8$ and $C_4H_{10}$; a filter having a central wavelength of 3.45 μm and a FWHM of 200 nm for detecting $C_3H_8$ and $C_4H_{10}$; a filter having a central wavelength of 4.30 μm and a FWHM of 300 nm for detecting $CO_2$; and a filter having a central wavelength of 4.67 μm and a FWHM of 380 nm for detecting CO.

Figure 3A:
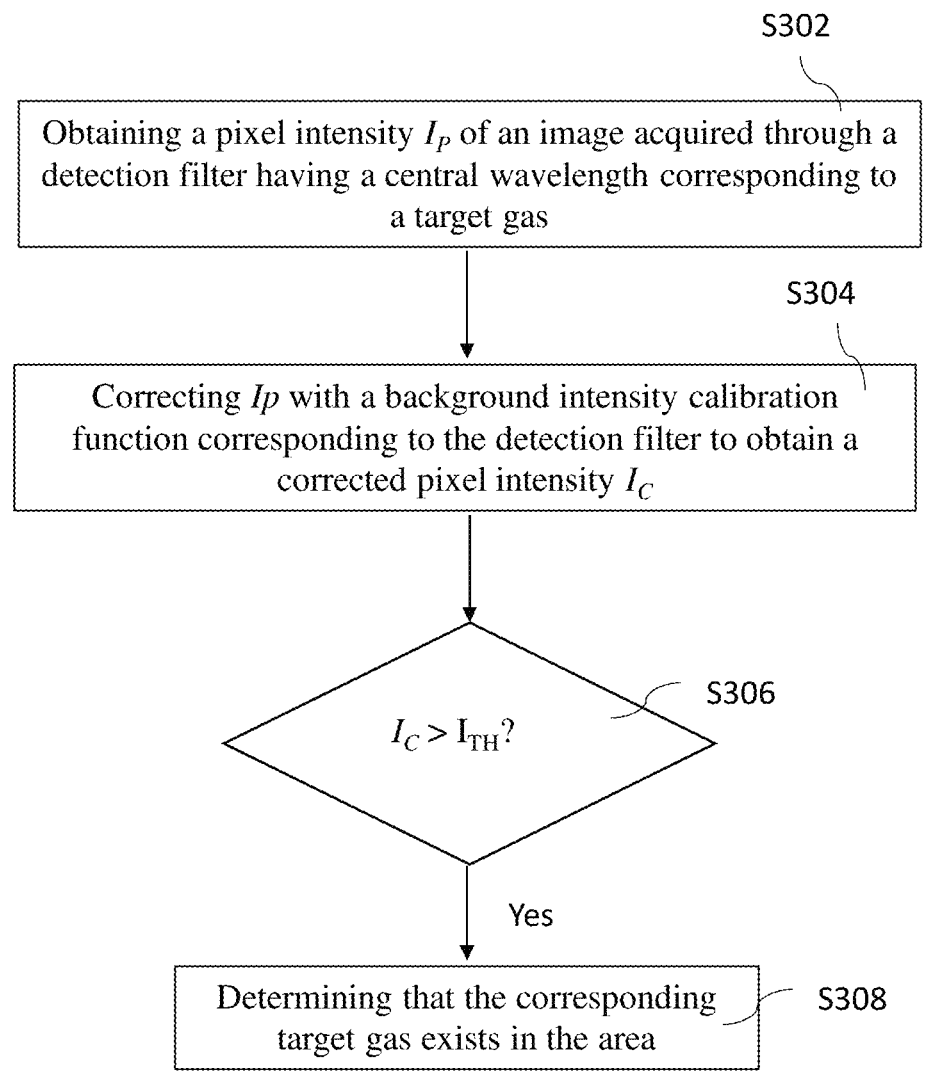
FIG. 3A depicts a process for determining whether a target gas exists in an area in accordance with some embodiments of the present invention.

Referring to FIG. 3A, in accordance with some embodiments of the present invention, the step S130 of determining existence of the one or more target gases based on the one or more acquired images may include:

S302: obtaining a pixel intensity $I_P$ of an image acquired through a detection filter corresponding to a target gas;

S304: correcting the pixel intensity $I_P$ with a calibrated background intensity corresponding to the detection filter to obtain a corrected pixel intensity Ic;

S306: comparing the corrected pixel intensity $I_C$ with a threshold $I_{TH}$ predetermined for the target gas;

S308: if the corrected pixel intensity Ic is greater than the threshold $I_{TH}$, determining that the corresponding target gas exists in the area.

Figure 3B:
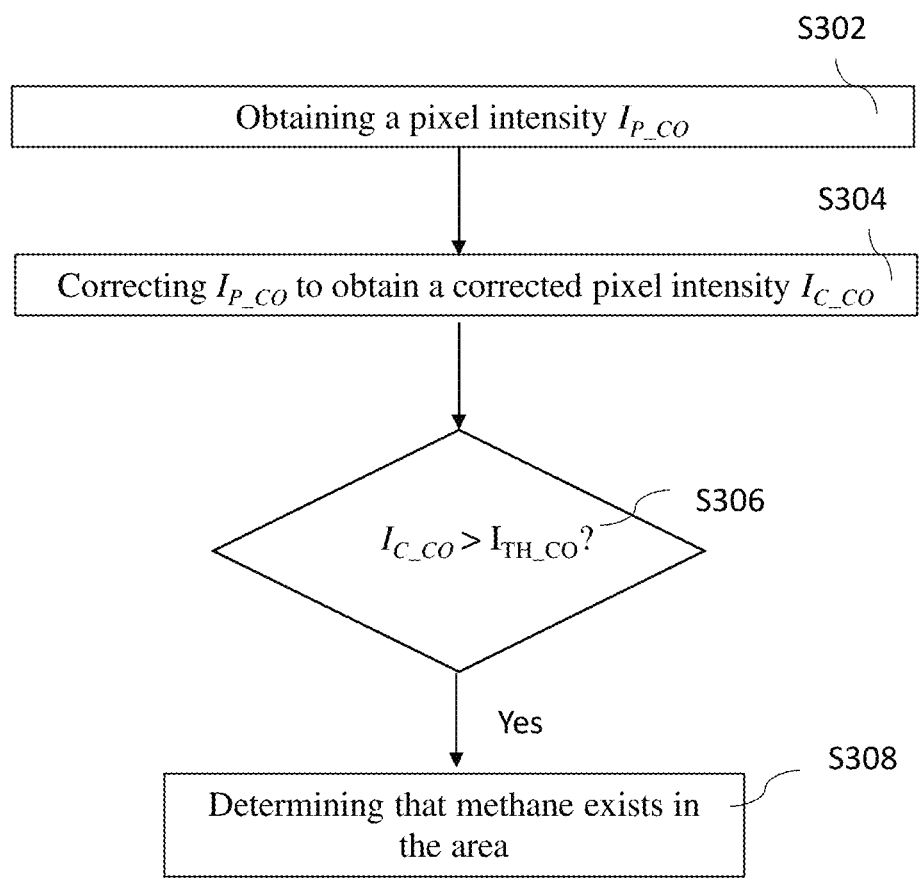
FIG. 3B depicts an exemplary process for determining whether carbon monoxide exists in an area.

FIG. 3B shows an exemplary process for determining whether carbon monoxide exists in an area.

In step S302, a pixel intensity $I_{P\_CO}$ of an image acquired through a detection filter having a central wavelength of 4.67 μm and a FWHM of 380 nm corresponding to carbon monoxide is obtained.

In step S304, the pixel intensity $I_{P\_CO}$ is corrected with a calibrated background intensity corresponding to the detection filter to obtain a corrected pixel intensity $I_{C\_CO}$.

In step S306, the corrected pixel intensity $I_{C\_CO}$ is compared with a threshold $I_{TH\_CO}$ predetermined for carbon monoxide.

In step S308, if the corrected pixel intensity $I_{C\_CO}$ is greater than the threshold $I_{TH\_CO}$, it is determined that carbon monoxide exists in the area.

Figure 4A:
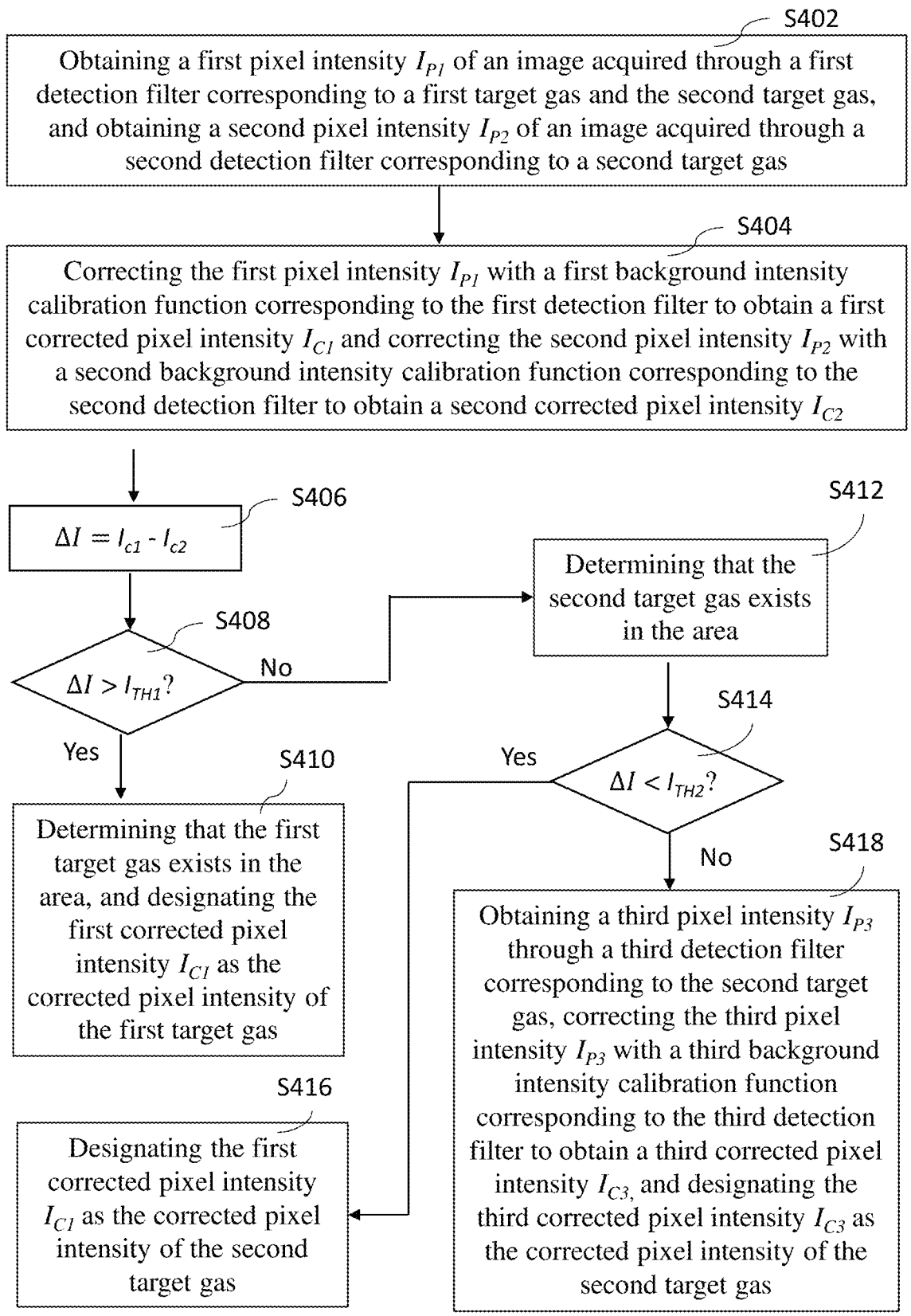
FIG. 4A depicts a process for determining whether a first target gas or a second target gas with an absorption curve overlapping the one of the first target gas exists in an area in accordance with some embodiments of the present invention.

Referring to FIG. 4, in accordance with some embodiments of the present invention, the step S130 of determining existence of the one or more target gases based on the one or more acquired images may further include:

S402: obtaining a first pixel intensity $I_{P1}$ of an image acquired through a first detection filter corresponding to a first target gas and a second target gas and obtaining a second pixel intensity $I_{P2}$ of an image acquired through a second detection filter corresponding to the second target gas;

S404: correcting the first pixel intensity $I_{P1}$ with a first calibrated background intensity corresponding to the first detection filter to obtain a first corrected pixel intensity $I_{C1}$ and correcting the second pixel intensity $I_{P2}$ with a second calibrated background intensity corresponding to the second detection filter to obtain a second corrected pixel intensity $I_{C2}$;

S406: computing an intensity difference ΔI between the first corrected pixel intensity Ic and the second corrected pixel intensity $I_{C2}$, that is, $\Delta I = I_{C1} - I_{C2}$.

S408: comparing the intensity difference ΔI with a first threshold $I_{TH1}$ predetermined for the first and second target gases.

S410: if the intensity difference ΔI is greater than the first threshold $I_{TH1}$, determining that the first target gas exists in the area and designating the first corrected pixel intensity $I_{C1}$ as the corrected pixel intensity of the first target gas.

S412: if the intensity difference ΔI is equal or smaller than the first threshold $I_{TH1}$, determining that the second target gas exists in the area.

S414: comparing the intensity difference ΔI with a second threshold $I_{TH2}$ predetermined for the first and second target gases, wherein second threshold $I_{TH2}$ is smaller than the first threshold $I_{TH1}$;

S416: if the intensity difference ΔI is smaller than the second threshold $I_{TH2}$, designating the first corrected pixel intensity $I_{C1}$ as the corrected pixel intensity of the second target gas;

S418: if the intensity difference ΔI is equal or greater than the second threshold $I_{TH2}$, obtaining a third pixel intensity $I_{P3}$ through a third detection filter corresponding to the second target gas, correcting the third pixel intensity $I_{P3}$ with a third calibrated background intensity corresponding to the third detection filter to obtain a third corrected pixel intensity $I_{C3}$, and designating the third corrected pixel intensity $I_{C3}$ as the corrected pixel intensity of the second target gas.

Figure 4B:
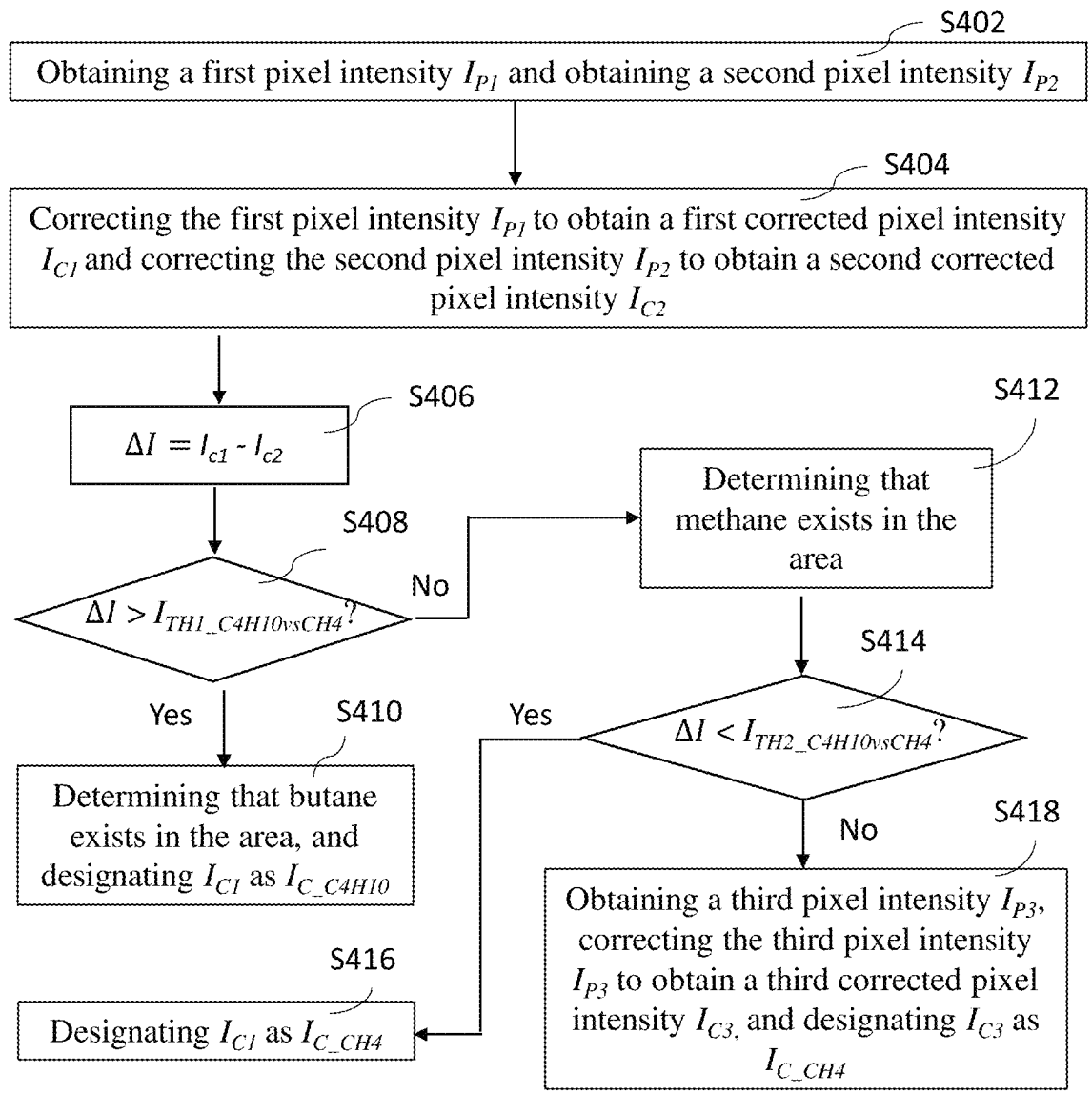
FIG. 4B depicts an exemplary process for determining whether butane or methane exists in an area.

FIG. 4B shows an exemplary process for determining whether butane or methane (which has an absorption band overlapping with the one of butane) exists in an area.

In step S402, a first pixel intensity $I_{P1}$ of an image acquired through a first detection filter having a central wavelength of 3.45 μm and a FWHM of 200 nm corresponding to butane and methane and a second pixel intensity $I_{P2}$ of an image acquired through a second detection filter having a central wavelength of 3.20 μm and a FWHM of 200 nm corresponding to methane are obtained.

In step S404, the first pixel intensity $I_{P1}$ is corrected with a first calibrated background intensity corresponding to the first detection filter to obtain a first correct pixel intensity $I_{C1}$ and the second pixel intensity $I_{P2}$ is corrected with a second calibrated background intensity corresponding to the second detection filter to obtain a second correct pixel intensity $I_{C2}$.

In step S406, an intensity difference ΔI between the first corrected pixel intensity Ich and the second corrected pixel intensity $I_{C2}$ is computed.

In step S408, the intensity difference ΔI is compared with a first threshold $I_{TH1\_C4H10vsCH4}$ predetermined for methane and butane.

In step S410, if the intensity difference ΔI is greater than the first threshold $I_{TH1\_C4H10vsCH4}$, it is determined that butane exists in the area and the first corrected pixel intensity $I_{C1}$ is designated as the corrected pixel intensity of butane $I_{C1\_C4H10}$ and used for butane concentration prediction.

In step S412, if the intensity difference ΔI is equal or smaller than the first threshold $I_{TH1\_C4H10vsCH4}$, it is determined that methane exists in the area.

In step S414, the intensity difference ΔI is compared with a second threshold $I_{TH2\_C4H10vsCH4}$ predetermined for methane and butane, where second threshold $I_{TH2\_C4H10vsCH4}$ is smaller than the first threshold $I_{TH1\_C4H10vsCH4}$.

In step S416, if the intensity difference is smaller than the second threshold $I_{TH2\_C4H10vsCH4}$, the first corrected pixel intensity $I_{C1}$ is designated as the corrected pixel intensity of methane $I_{C2\_CH4}$ and used for methane concentration prediction.

In step S418, if the intensity difference ΔI is equal to or greater than the second threshold $I_{TH2\_C4H10vsCH4}$, a third pixel intensity $I_{P3}$ of an image acquired through a third detection filter having a central wavelength of 3.375 μm and a FWHM of 500 nm corresponding to methane are obtained, and the third pixel intensity $I_{P3}$ is corrected with a third calibrated background intensity corresponding to the third detection filter to obtain a third correct pixel intensity $I_{C3}$, the third corrected pixel intensity $I_{C3}$ is designated as the corrected pixel intensity of methane $I_{C3\_CH4}$ and used for methane concentration prediction.

In some embodiments, for a detected pixel intensity $I_p$ of an image acquired through a detection filter, a corrected pixel intensity $I_c$ may be given by:

$$I_c = \frac{I_p}{I_o - \tau},$$

where $I_o$ is the calibrated background intensity corresponding to the detection filter, and τ is a dynamic threshold value to eliminate dark background contribution to enhance sensitivity.

The calibrated background intensity $I_o$ corresponding to the detection filter may be given by:

$$I_o = f(I_{ref}) = k_1 \cdot I_{ref} + k_2,$$

where $f(I_{ref})$ is the background intensity calibration function, $I_{ref}$ is the pixel-intensity detected by the image sensor through a reference filter, $k_1$ and $k_2$ are curve fitting factors obtained by plotting pixel-intensities of a background image acquired through the detection filter against the pixel-intensities of a background image acquired through the reference filter.

Preferably, the reference filter is selected to have a band pass window different from those of the gas detection filters. For example, a reference filter having a central wavelength of 3.95 μm and a FWHM of 200 nm may be used for obtaining the background intensity calibration functions in detection of methane, propane, butane, carbon dioxide and carbon monoxide respectively.

Figure 5:
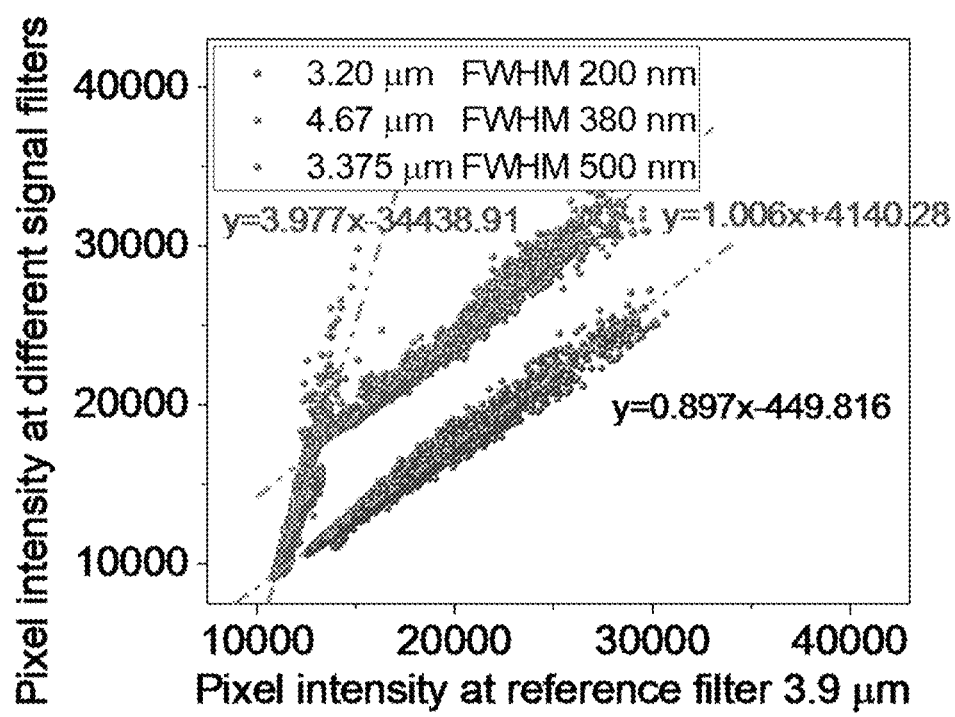
FIG. 5 shows curves of plotting pixel-intensity of an image acquired through various detection filters against the pixel-intensity of an image acquired through the reference filter.

As shown in FIG. 5, the background intensity calibration function for detecting methane may be obtained by plotting pixel-intensity of an image acquired through the gas detection filter having a central wavelength of 3.20 μm and a FWHM of 200 nm against the pixel-intensity of an image acquired through the reference filter having a central wavelength of 3.95 μm and a FWHM of 200 nm, which is found to be:

$$I_0(3.20 \text{ μm}) = 0.897 \times I_{reference} - 449.816$$

The background intensity calibration function for detecting carbon monoxide may be obtained by plotting pixel-intensity of an image acquired through the gas detection filter having a central wavelength of 4.67 μm and a FWHM of 380 nm against the pixel-intensity of an image acquired through the reference filter having a central wavelength of 3.95 μm and a FWHM of 200 nm, which is found to be:

$$I_0(4.67 \text{ μm}) = 1.006 \times I_{reference} + 4140.28$$

In step S140, the non-linear prediction model for predicting concentration of a target gas may be given by:

$$c = \left\{ -\frac{1}{a} \cdot \ln\left[ \frac{1}{1-m} \times \left( \frac{I_C - \tau}{I_o - \tau} - m \right) \right] \right\}^{\frac{1}{b}}$$

where c is the predicted concentration of the target gas, $I_C$ is a corrected pixel intensity of the target gas, $I_o$ is the calibrated background intensity using in detecting the pixel intensity of the target gas, a is a factor representing contribution of nonlinearity from wavelength dependence of the absorption coefficient of the target gas, b is a factor representing contribution of nonlinearity from wavelength dependence of the absorption spectrum shape of the target gas, and m is a factor representing contribution of nonlinearity from the non-absorbing area between the absorption band of the target gas and band-width of the detection filter; τ is a dynamic threshold value to eliminate dark background contribution to enhance sensitivity.

For examples, the non-linear prediction model for predicting concentration of methane is given by:

$$c = \left\{ -\frac{1}{0.210} \cdot \ln\left( \frac{I_C - \tau}{I_o - \tau} \right) \right\}^{\frac{1}{0.421}}.$$

FIG. 6A shows an exemplary curve of predicted concentration of methane plotted against detected pixel-intensity. FIG. 6B shows an exemplary methane distribution image of an area based on the predicted concentration of methane.

The non-linear prediction model for predicting concentration of butane is given by:

$$c = \left\{ -\frac{1}{1.095} \cdot \ln\left( \frac{\frac{I_C - \tau}{I_o - \tau} - 0.363}{1 - 0.363} \right) \right\}^{\frac{1}{0.422}}.$$

FIG. 7A shows an exemplary curve of predicted concentration of butane plotted against detected pixel-intensity. FIG. 7B shows an exemplary butane distribution image of an area based on the predicted concentration of butane.

The non-linear prediction model for predicting concentration of carbon monoxide is given by:

$$c = \left\{-\frac{1}{0.699} \cdot \ln\left(\frac{\frac{I_C - \tau}{I_o - \tau} - 0.725}{1 - 0.725}\right)\right\}^{\frac{1}{0.519}}$$

FIG. 8A shows an exemplary curve of predicted concentration of carbon monoxide plotted against detected pixel-intensity. FIG. 8B shows an exemplary carbon monoxide distribution image of an area based on the predicted concentration of carbon monoxide.

Figure 9:
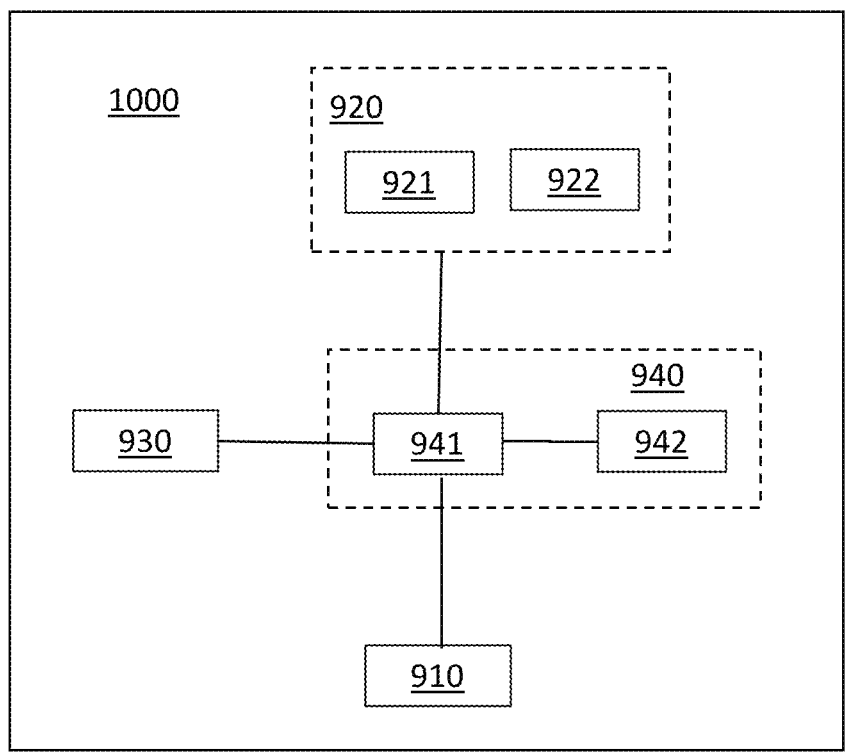
FIG. 9 depicts a system for remote imaging of explosive gases in an area according to some embodiments of the present invention.

FIG. 9 depicts a system for remote imaging of explosive gases in an area according to some embodiments of the present invention. Referring to FIG. 9, the system includes an active light source 910, a camera 920, a filter wheel system 930, and a computer 940.

The active light source 910 emits a light beam having uniform light intensity distribution over the mid-wave infrared range. Preferably, the light source 910 has a parabolic reflector for illumination.

The camera 920 may have an infrared image sensor 921 and an optical lens 922 configured to capture the infrared image of the illuminated area.

The filter wheel system 930 may include a plurality of detection filters, each has a central wavelength and a full width at half maximum (FWHM) corresponding to an absorption band of a target gas to be detected.

The computer 940 may include a processor 941 and a non-transitory computer readable medium 942 storing a program causing the processor 941 to control the active light source 910, the camera 920 and the filter wheel system 930 to perform the above-said method for remote imaging of explosive gases in the area.

The functional units and modules of the system and method for remote imaging of explosive gases in an area in accordance with the embodiments disclosed herein may be implemented using computing devices, computer processors, or electronic circuitries including but not limited to application specific integrated circuits (ASIC), field programmable gate arrays (FPGA), microcontrollers, and other programmable logic devices configured or programmed according to the teachings of the present disclosure. Computer instructions or software codes running in the computing devices, computer processors, or programmable logic devices can readily be prepared by practitioners skilled in the software or electronic art based on the teachings of the present disclosure.

All or portions of the methods in accordance to the embodiments may be executed in one or more computing devices including server computers, personal computers, laptop computers, mobile computing devices such as smartphones and tablet computers.

The embodiments may include computer storage media, transient and non-transient memory devices having computer instructions or software codes stored therein, which can be used to program or configure the computing devices, computer processors, or electronic circuitries to perform any of the processes of the present invention. The storage media, transient and non-transient memory devices can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

Each of the functional units and modules in accordance with various embodiments also may be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A method for remote imaging of explosive gases in an area, comprising:
    illuminating the area with a light source having a uniform light intensity distribution over an infrared wavelength range;
    acquiring one or more images of the illuminated area with an image sensor through one or more gas detection filters having bandpass central wavelength corresponding to absorption curves of one or more target gases respectively;
    determining existence of the one or more target gases based on the one or more acquired images;
    predicting one or more distribution of gas concentration for one or more existing target gases respectively by using a non-linear prediction model; and
    constructing one or more gas distribution images of the area based on the one or more predicted distribution of gas concentration.

2. The method of claim 1, wherein determining existence of the one or more target gases comprises:
    obtaining a pixel intensity $I_P$ of an image acquired through a detection filter corresponding to a target gas;
    correcting the pixel intensity $I_P$ with a calibrated background intensity corresponding to the detection filter to obtain a corrected pixel intensity Ic;
    comparing the corrected pixel intensity $I_C$ with a threshold $I_{TH}$ predetermined for the target gas;
    if the corrected pixel intensity $I_C$ is greater than the threshold $I_{TH}$, determining that the corresponding target gas exists in the area.

3. The method of claim 2, wherein the corrected pixel intensity $I_c$ may be given by:

$$I_c = \frac{I_p}{I_o - \tau},$$

where $I_o$ is the calibrated background intensity corresponding to the detection filter used for detecting the target gas, and $\tau$ is a dynamic threshold value to eliminate dark background contribution to enhance sensitivity.

4. The method of claim 3, wherein the calibrated background intensity corresponding to the detection filter is given by:

$$I_o = f(I_{ref}) = k_1 \cdot I_{ref} + k_2,$$

where $I_{ref}$ is the pixel-intensity detected by the image sensor through a reference filter, $k_1$ and $k_2$ are curve fitting factors obtained by plotting pixel-intensities of a background image acquired through the detection filter against the pixel-intensities of a background image acquired through the reference filter.

5. The method of claim 1, wherein determining existence of the one or more target gases comprises:
   obtaining a first pixel intensity $I_{P1}$ of an image acquired through a first detection filter corresponding to a first target gas and a second target gas and obtaining a second pixel intensity $I_{P2}$ of an image acquired through a second detection filter corresponding to a second target gas;
   correcting the first pixel intensity $I_{P1}$ with a first calibrated background intensity corresponding to the first detection filter to obtain a first corrected pixel intensity $I_{C1}$ and correcting the second pixel intensity $I_{P2}$ with a second calibrated background intensity corresponding to the second detection filter to obtain a second corrected pixel intensity $I_{C2}$;
   computing an intensity difference $\Delta I$ between the first corrected pixel intensity $I_{C1}$ and the second corrected pixel intensity $I_{C2}$;
   comparing the intensity difference $\Delta I$ with a first threshold $I_{TH1}$ predetermined for the first and second target gases;
   if the intensity difference $\Delta I$ is greater than the first threshold $I_{TH1}$, determining that the first target gas exists in the area and designating the first corrected pixel intensity $I_{C1}$ as a corrected pixel intensity of the first target gas;
   if the intensity difference $\Delta I$ is equal to or smaller than the first threshold $I_{TH1}$, determining that the second target gas exists in the area;
   comparing the intensity difference $\Delta I$ with a second threshold $I_{TH2}$ predetermined for the first and second target gases, wherein second threshold $I_{TH2}$ is smaller than the first threshold $I_{TH1}$;
   if the intensity difference $\Delta I$ is smaller than the second threshold $I_{TH2}$, designating the first corrected pixel intensity $I_{C1}$ as a corrected pixel intensity of the second target gas; and
   if the intensity difference $\Delta I$ is equal to or greater than the second threshold $I_{TH2}$, obtaining a third pixel intensity $I_{P3}$ through a third detection filter corresponding to the second target gas, correcting the third pixel intensity $I_{P3}$ with a third calibrated background intensity corresponding to the third detection filter to obtain a third corrected pixel intensity $I_{C3}$, and designating the third corrected pixel intensity $I_{C3}$ as the corrected pixel intensity of the second target gas.

6. The method of claim 5, wherein
the first corrected pixel intensity $I_{C1}$ may be given by:

$$I_{C1} = \frac{I_{P1}}{I_{o1} - \tau},$$

$I_{o1}$ is the calibrated background intensity corresponding to the first detection filter, and $\tau$ is a dynamic threshold value to eliminate dark background contribution to enhance sensitivity;
the second corrected pixel intensity $I_{C2}$ may be given by:

$$I_{C2} = \frac{I_{P2}}{I_{o2} - \tau},$$

where $I_{o2}$ is the calibrated background intensity corresponding to the second detection filter; and
the third corrected pixel intensity $I_{C3}$ may be given by:

$$I_{C3} = \frac{I_{P3}}{I_{o3} - \tau},$$

where $I_{o3}$ is the calibrated background intensity corresponding to the third detection filter.

7. The method of claim 6, wherein
the calibrated background intensity corresponding to the first detection filter is given by:

$$I_{o1} = f_1(I_{ref}) = k_{11} \cdot I_{ref} + k_{21},$$

where $I_{ref}$ is the pixel-intensity detected by the image sensor through a reference filter, $k_{11}$ and $k_{21}$ are curve fitting factors obtained by plotting pixel-intensities of a background image acquired through the first detection filter against the pixel-intensities of a background image acquired through the reference filter;
the calibrated background intensity corresponding to the second detection filter is given by:

$$I_{o2} = f_2(I_{ref}) = k_{12} \cdot I_{ref} + k_{22},$$

where $I_{ref}$ is the pixel-intensity detected by the image sensor through a reference filter, $k_{12}$ and $k_{22}$ are curve fitting factors obtained by plotting pixel-intensities of a background image acquired through the second detection filter against the pixel-intensities of a background image acquired through the reference filter; and
the calibrated background intensity corresponding to the third detection filter is given by:

$$I_{o3} = f_3(I_{ref}) = k_{13} \cdot I_{ref} + k_{23},$$

where $I_{ref}$ is the pixel-intensity detected by the image sensor through a reference filter, $k_{13}$ and $k_{23}$ are curve fitting factors obtained by plotting pixel-intensities of a background image acquired through the third detection filter against the pixel-intensities of a background image acquired through the reference filter.

8. The method of claim 1, wherein the non-linear prediction model for predicting concentration of a target gas may be given by:

$$c = \left\{ -\frac{1}{a} \cdot \ln\left[ \frac{1}{1-m} \times \left( \frac{I_C - \tau}{I_o - \tau} - m \right) \right] \right\}^{\frac{1}{b}}$$

where c is the predicted concentration of the target gas, $I_C$ is a corrected pixel intensity of the target gas, $I_o$ is the calibrated background intensity using in detecting the pixel intensity of the target gas, a is a factor representing contribution of nonlinearity from wavelength dependence of the absorption coefficient of the target gas, b is a factor representing contribution of nonlinearity from wavelength dependence of the absorption spectrum shape of the target gas, and m is a factor representing contribution of nonlinearity from a non-absorbing area between the absorption band of the target gas and band-width of the detection filter; $\tau$ is a dynamic threshold value to eliminate dark background contribution to enhance sensitivity.

9. A system for remote imaging of explosive gases in an area, comprising:

an active light source configured to illuminate the area with a light beam having uniform light intensity distribution over a mid-wave infrared range;

an infrared image sensor configured to capture an infrared image of the illuminated area;

a filter wheel system including a plurality of detection filters, each having a central wavelength and a full width at half maximum corresponding to an absorption curve of a target gas to be detected; and a processor configured to control the active light source, the image sensor and the filter wheel system to perform the method of claim 1.

10. The system of claim 9, wherein determining existence of the one or more target gases comprises:

obtaining a pixel intensity $I_P$ of an image acquired through a detection filter corresponding to a target gas;

correcting the pixel intensity $I_P$ with a calibrated background intensity corresponding to the detection filter to obtain a corrected pixel intensity Ic;

comparing the corrected pixel intensity $I_C$ with a threshold $I_{TH}$ predetermined for the target gas;

if the corrected pixel intensity $I_C$ is greater than the threshold $I_{TH}$, determining that the corresponding target gas exists in the area.

11. The system of claim 10, wherein the corrected pixel intensity $I_c$ may be given by:

$$I_c = \frac{I_p}{I_o - \tau},$$

where $I_o$ is the calibrated background intensity corresponding to the detection filter used for detecting the target gas, and $\tau$ is a dynamic threshold value to eliminate dark background contribution to enhance sensitivity.

12. The system of claim 11, wherein the calibrated background intensity corresponding to the detection filter is given by:

$$I_o = f(I_{ref}) = k_1 \cdot I_{ref} + k_2,$$

where $I_{ref}$ is the pixel-intensity detected by the image sensor through a reference filter, $k_1$ and $k_2$ are curve fitting factors obtained by plotting pixel-intensities of a background image acquired through the detection filter against the pixel-intensities of a background image acquired through the reference filter.

13. The system of claim 9, wherein determining existence of the one or more target gases comprises:

obtaining a first pixel intensity $I_{P1}$ of an image acquired through a first detection filter corresponding to a first target gas and a second target gas and obtaining a second pixel intensity $I_{P2}$ of an image acquired through a second detection filter corresponding to a second target gas;

correcting the first pixel intensity $I_{P1}$ with a first calibrated background intensity corresponding to the first detection filter to obtain a first corrected pixel intensity $I_{C1}$ and correcting the second pixel intensity $I_{P2}$ with a second calibrated background intensity corresponding to the second detection filter to obtain a second corrected pixel intensity $I_{C2}$;

computing an intensity difference $\Delta I$ between the first corrected pixel intensity $I_{C1}$ and the second corrected pixel intensity $I_{C2}$;

comparing the intensity difference $\Delta I$ with a first threshold $I_{TH1}$ predetermined for the first and second target gases;

if the intensity difference $\Delta I$ is greater than the first threshold $I_{TH1}$, determining that the first target gas exists in the area and designating the first corrected pixel intensity $I_{C1}$ as a corrected pixel intensity of the first target gas;

if the intensity difference $\Delta I$ is equal to or smaller than the first threshold $I_{TH1}$, determining that the second target gas exists in the area;

comparing the intensity difference $\Delta I$ with a second threshold $I_{TH2}$ predetermined for the first and second target gases, wherein second threshold $I_{TH2}$ is smaller than the first threshold $I_{TH1}$;

if the intensity difference $\Delta I$ is smaller than the second threshold $I_{TH2}$, designating the first corrected pixel intensity $I_{C1}$ as a corrected pixel intensity of the second target gas; and if the intensity difference $\Delta I$ is equal to or greater than the second threshold $I_{TH2}$, obtaining a third pixel intensity $I_{P3}$ through a third detection filter corresponding to the second target gas, correcting the third pixel intensity $I_{P3}$ with a third calibrated background intensity corresponding to the third detection filter to obtain a third corrected pixel intensity $I_{C3}$, and designating the third corrected pixel intensity $I_{C3}$ as the corrected pixel intensity of the second target gas.

14. The system of claim 13, wherein the first corrected pixel intensity $I_{C1}$ may be given by:

$$I_{C1} = \frac{I_{P1}}{I_{o1} - \tau},$$

$I_{o1}$ is the calibrated background intensity corresponding to the first detection filter, and $\tau$ is a dynamic threshold value to eliminate dark background contribution to enhance sensitivity;

the second corrected pixel intensity $I_{C2}$ may be given by:

$$I_{C2} = \frac{I_{P2}}{I_{o2} - \tau},$$

where $I_{o2}$ is the calibrated background intensity corresponding to the second detection filter; and the third corrected pixel intensity $I_{C3}$ may be given by:

$$I_{C3} = \frac{I_{P3}}{I_{o3} - \tau},$$

where $I_{o3}$ is the calibrated background intensity corresponding to the third detection filter.

15. The system of claim 14, wherein the calibrated background intensity corresponding to the first detection filter is given by:

$$I_{o1} = f_1(I_{ref}) = k_{11} \cdot I_{ref} + k_{21};$$

where $I_{ref}$ is the pixel-intensity detected by the image sensor through a reference filter, $k_{11}$ and $k_{21}$ are curve fitting factors obtained by plotting pixel-intensities of a background image acquired through the first detection filter against the pixel-intensities of a background image acquired through the reference filter;

the calibrated background intensity corresponding to the second detection filter is given by:

$$I_{o2} = f_2(I_{ref}) = k_{12} \cdot I_{ref} + k_{22},$$

where $I_{ref}$ is the pixel-intensity detected by the image sensor through a reference filter, $k_{12}$ and $k_{22}$ are curve fitting factors obtained by plotting pixel-intensities of a background image acquired through the second detection filter against the pixel-intensities of a background image acquired through the reference filter; and the calibrated background intensity corresponding to the third detection filter is given by:

$$I_{o3}=f_3(I_{ref})=k_{13} \cdot I_{ref}+k_{23},$$

where $I_{ref}$ is the pixel-intensity detected by the image sensor through a reference filter, $k_{13}$ and $k_{23}$ are curve fitting factors obtained by plotting pixel-intensities of a background image acquired through the third detection filter against the pixel-intensities of a background image acquired through the reference filter.

16. The system of claim 9, wherein the non-linear prediction model for predicting concentration of a target gas may be given by:

$$c = \left\{ -\frac{1}{a} \cdot \ln\left[ \frac{1}{1-m} \times \left( \frac{I_C - \tau}{I_o - \tau} - m \right) \right] \right\}^{\frac{1}{b}}$$

where c is the predicted concentration of the target gas, $I_C$ is a corrected pixel intensity of the target gas, $I_o$ is the calibrated background intensity using in detecting the pixel intensity of the target gas, a is a factor representing contribution of nonlinearity from wavelength dependence of the absorption coefficient of the target gas, b is a factor representing contribution of nonlinearity from wavelength dependence of the absorption spectrum shape of the target gas, and m is a factor representing contribution of nonlinearity from a non-absorbing area between the absorption band of the target gas and band-width of the detection filter; $\tau$ is a dynamic threshold value to eliminate dark background contribution to enhance sensitivity.

* * * * *